United States Patent
Watanabe

(10) Patent No.: US 7,515,066 B2
(45) Date of Patent: Apr. 7, 2009

(54) APPARATUS PROVIDING INFORMATION OF A VEHICLE'S SURROUNDINGS

(75) Inventor: Mitsuaki Watanabe, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 275 days.

(21) Appl. No.: 11/453,341

(22) Filed: Jun. 14, 2006

(65) Prior Publication Data
US 2007/0013497 A1    Jan. 18, 2007

(30) Foreign Application Priority Data
Jun. 21, 2005    (JP) ............................. 2005-180454

(51) Int. Cl.
G08G 1/16    (2006.01)
(52) U.S. Cl. .................. 340/903; 340/435; 340/438; 701/34
(58) Field of Classification Search .............. 340/903, 340/435, 436–439, 937; 701/34, 35, 301
See application file for complete search history.

(56) References Cited

U.S. PATENT DOCUMENTS

| | | | |
|---|---|---|---|
| 5,699,149 A | 12/1997 | Kuroda et al. | |
| 6,559,761 B1 * | 5/2003 | Miller et al. | 340/435 |
| 7,061,373 B2 * | 6/2006 | Takahashi | 340/435 |
| 2003/0141965 A1 * | 7/2003 | Gunderson et al. | 340/431 |
| 2004/0178892 A1 * | 9/2004 | Anderson et al. | 340/435 |
| 2005/0021201 A1 * | 1/2005 | Klotz et al. | 701/35 |
| 2005/0062615 A1 * | 3/2005 | Braeuchle et al. | 340/903 |

* cited by examiner

Primary Examiner—Brent Swarthout
(74) Attorney, Agent, or Firm—Brinks Hofer Gilson & Lione

(57) ABSTRACT

In an apparatus for providing information about a vehicle's surroundings, if failure in a sensor occurs, a warning fault calculating unit registers "fault" in the entry of a warning type influenced by the failure in the sensor and generates a message warning that an operation fault has occurred in the warning type due to the failure. A warning generating unit determines whether the vehicle is in a state in which a warning the warning type should be generated on the basis of sensor information received from a sensor information processing unit. If the warning should be generated, the warning generating unit transmits a warning of the warning type to a warning output control unit. The warning generating unit does not transmit a warning of the warning type if the fault status of the warning type is "fault".

16 Claims, 11 Drawing Sheets

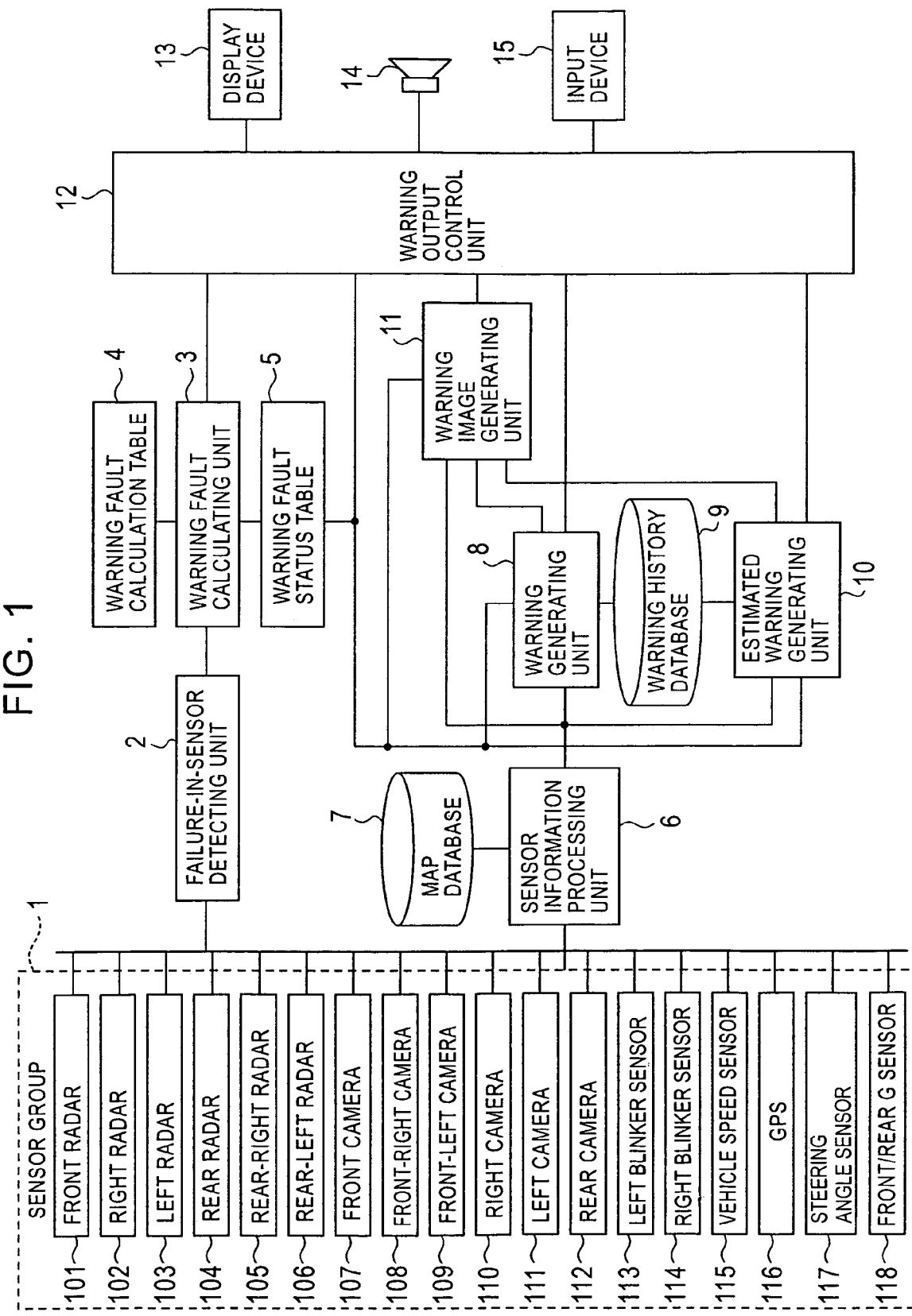

FIG. 2

| WARNING NUMBER | TYPES OF WARNING | RADAR | | | | | | CAMERA | | | | | | BLINKER | | VEHICLE SPEED SIGNAL | GPS | STEERING ANGLE | FRONT/REAR G SENSOR |
|---|---|---|---|---|---|---|---|---|---|---|---|---|---|---|---|---|---|---|---|
| SENSOR NUMBER | | 1 | 2 | 3 | 4 | 5 | 6 | 7 | 8 | 9 | 10 | 11 | 12 | 13 | 14 | 15 | 16 | 17 | 18 |
| | | FRONT | RIGHT | LEFT | REAR | REAR RIGHT | REAR LEFT | FRONT | FRONT RIGHT | FRONT LEFT | RIGHT | LEFT | REAR | LEFT | RIGHT | | | | |
| 1 | APPROACH OF VEHICLE IN FRONT | INFLU-ENCED | | | | | | INFLU-ENCED | | | | | | | | INFLU-ENCED | | | |
| 2 | APPROACH OF CROSSING VEHICLE (4 WHEELS) FROM RIGHT | | INFLU-ENCED | | | | | | INFLU-ENCED | | | | | | | | INFLU-ENCED | | INFLU-ENCED |
| 3 | APPROACH OF CROSSING VEHICLE (2 WHEELS) FROM RIGHT | | INFLU-ENCED | | | | | | INFLU-ENCED | | | | | | | | INFLU-ENCED | | INFLU-ENCED |
| 4 | SUDDEN APPEARANCE FROM RIGHT | | INFLU-ENCED | | | | | | INFLU-ENCED | | | | | | | | INFLU-ENCED | | INFLU-ENCED |
| 5 | APPROACH OF 4-WHEEL VEHICLE ON RIGHT SIDE | | INFLU-ENCED | | | | | | | | INFLU-ENCED | | | | | | | | |
| 6 | APPROACH OF 2-WHEEL VEHICLE ON RIGHT SIDE | | INFLU-ENCED | | | | | | | | INFLU-ENCED | | | | | | | | |
| 7 | COLLISION WITH 2-WHEEL VEHICLE ON RIGHT SIDE | | INFLU-ENCED | | | | | | | | INFLU-ENCED | | | | | INFLU-ENCED | | | |
| 8 | APPROACH OF CROSSING VEHICLE (4 WHEELS) FROM LEFT | | | INFLU-ENCED | | | | | | INFLU-ENCED | | | | | | | INFLU-ENCED | INFLU-ENCED | |
| 9 | APPROACH OF CROSSING VEHICLE (2 WHEELS) FROM LEFT | | | INFLU-ENCED | | | | | | INFLU-ENCED | | | | | | | INFLU-ENCED | | |
| 10 | SUDDEN APPEARANCE FROM LEFT | | | INFLU-ENCED | | | | | | INFLU-ENCED | | | | | | | | | |
| 11 | APPROACH OF 4-WHEEL VEHICLE ON LEFT SIDE | | | INFLU-ENCED | | | | | | | | INFLU-ENCED | | | | | | | |
| 12 | APPROACH OF 2-WHEEL VEHICLE ON LEFT SIDE | | | INFLU-ENCED | | | | | | | | INFLU-ENCED | | | | | | | |
| 13 | COLLISION WITH 2-WHEEL VEHICLE ON LEFT SIDE | | | | | | | | | | | INFLU-ENCED | | INFLU-ENCED | | INFLU-ENCED | | | |
| 14 | PASS OF 2-WHEEL VEHICLE ON REAR-LEFT SIDE | | | | | | INFLU-ENCED | | | | | | INFLU-ENCED | INFLU-ENCED | | | | | |
| 15 | APPROACH OF VEHICLE ON REAR-LEFT SIDE | | | | | INFLU-ENCED | INFLU-ENCED | | | | | | INFLU-ENCED | INFLU-ENCED | | INFLU-ENCED | INFLU-ENCED | INFLU-ENCED | |
| 16 | PASS OF 2-WHEEL VEHICLE ON REAR-RIGHT SIDE | | | | | INFLU-ENCED | | | | | | | INFLU-ENCED | | INFLU-ENCED | INFLU-ENCED | INFLU-ENCED | INFLU-ENCED | |
| 17 | APPROACH OF VEHICLE ON REAR-RIGHT SIDE | | | | | | | | | | | | INFLU-ENCED | | INFLU-ENCED | INFLU-ENCED | | INFLU-ENCED | |
| 18 | APPROACH OF VEHICLE FROM BEHIND | | | | INFLU-ENCED | | | | | | | | INFLU-ENCED | | | INFLU-ENCED | | | INFLU-ENCED |

FIG. 3A

| WARNING NUMBER | FAULT STATUS | SENSOR IN FAILURE |
|---|---|---|
| WARNING 1 | NORMAL | |
| WARNING 2 | FAULT | FRONT-RIGHT CAMERA |
| WARNING 3 | NORMAL | |
| ⋮ | ⋮ | ⋮ |
| WARNING 18 | FAULT | REAR RADAR, REAR CAMERA |

FIG. 3B

| WARNING NUMBER | SENSOR-4 INFO | SENSOR-12 INFO | ......... | SENSOR-18 INFO |
|---|---|---|---|---|
| WARNING 18 | COORDINATE z 01 | COORDINATE z 02 / 2 WHEELS | ......... | DECELERATING |

| WARNING NUMBER | SENSOR2 INFO | SENSOR-8 INFO | ......... | SENSOR-18 INFO |
|---|---|---|---|---|
| WARNING 2 | COORDINATE y 01 | COORDINATE y 02 / 4 WHEELS | ......... | CRUISING |

| WARNING NUMBER | SENSOR-1 INFO | SENSOR-7 INFO | ......... | SENSOR-18 INFO |
|---|---|---|---|---|
| WARNING 1 | COORDINATE x 01 | COORDINATE x 02 / 4 WHEELS | ......... | ACCELERATING |
| | COORDINATE x 11 | COORDINATE x 12 / 2 WHEELS | ......... | ACCELERATING |
| | COORDINATE x 21 | COORDINATE x 22 / 4 WHEELS | ......... | CRUISING |
| | ⋮ | ⋮ | ⋮ | ⋮ |
| | COORDINATE x n1 | COORDINATE x n2 / 4 WHEELS | ......... | ACCELERATING |

| WARNING NUMBER | SENSOR-1 INFO | SENSOR-7 INFO | ......... | SENSOR-18 INFO |
|---|---|---|---|---|
| WARNING 1 | ~~COORDINATE x 01~~ | COORDINATE x 02 / 4 WHEELS | ......... | ACCELERATING |
| | ~~COORDINATE x 11~~ | COORDINATE x 12 / 2 WHEELS | ......... | ACCELERATING |
| | ~~COORDINATE x 21~~ | COORDINATE x 22 / 4 WHEELS | ......... | CRUISING |
| | ⋮ | ⋮ | ⋮ | ⋮ |
| | ~~COORDINATE x n1~~ | COORDINATE x n2 / 4 WHEELS | ......... | ACCELERATING |

C2

| SENSOR-2 INFO | ..... | SENSOR-7 INFO | ......... | SENSOR-18 INFO |
|---|---|---|---|---|
| COORDINATE x 02 / 4 WHEELS | ..... | COORDINATE x 02 / 4 WHEELS | ......... | ACCELERATING |

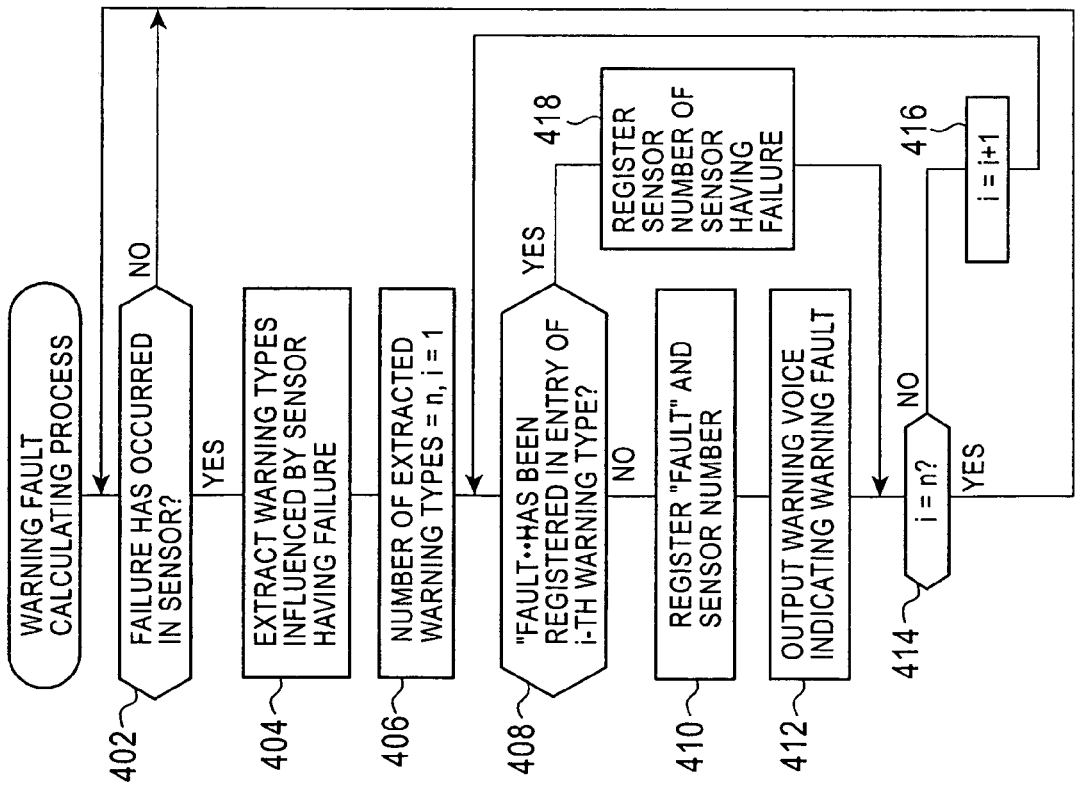
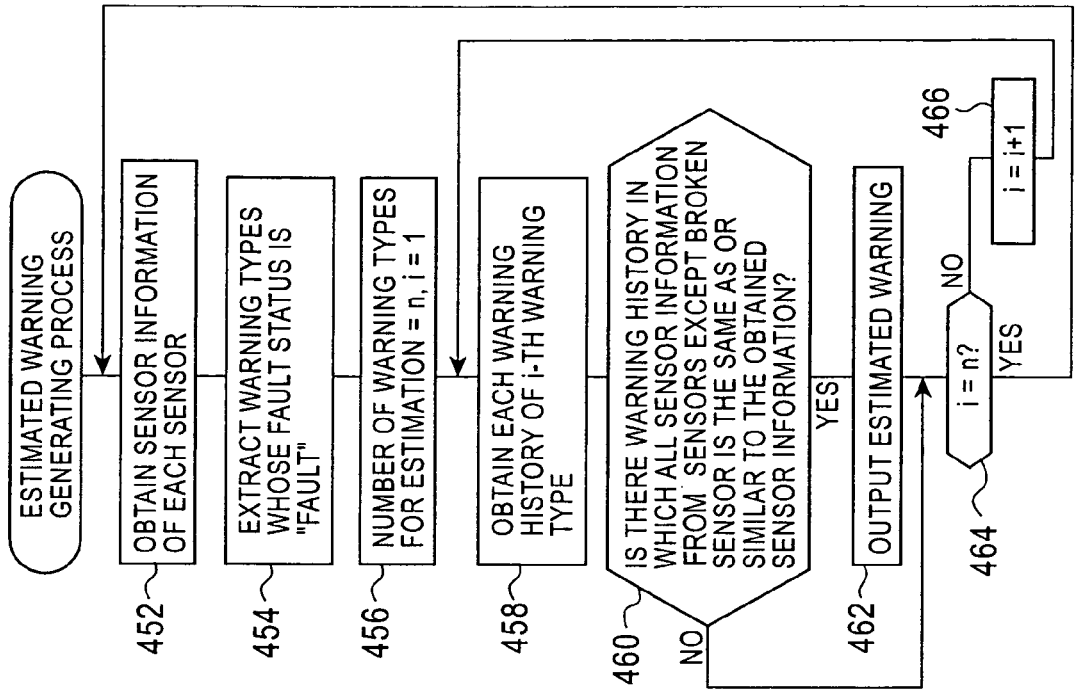

FIG. 7

| WARNING NUMBER | TYPES OF WARNING | | | | | | | | | | | | | | | | | LEVEL TABLE |
|---|---|---|---|---|---|---|---|---|---|---|---|---|---|---|---|---|---|---|
| 18 | APPROACH OF VEHICLE FROM BEHIND | | | | | | | | | | | | | | | | | LEVEL TABLE |
| 2 | APPROACH OF CROSSING VEHICLE (4 WHEELS) FROM RIGHT | | | | | | | | | | | | | | | | | LEVEL TABLE |
| 1 | APPROACH OF VEHICLE IN FRONT | | | | | | | | | | | | | | | | | |

| LEVEL | RADAR | | | | | | CAMERA | | | | | | BLINKER | | VEHICLE SPEED SIGNAL | GPS | STEERING ANGLE | FRONT/REAR G SENSOR |
|---|---|---|---|---|---|---|---|---|---|---|---|---|---|---|---|---|---|---|
| | FRONT | RIGHT | LEFT | REAR | REAR RIGHT | REAR LEFT | FRONT | FRONT RIGHT | FRONT LEFT | RIGHT | LEFT | REAR | LEFT | RIGHT | | | | |
| LEVEL 3 | FAILURE | · | · | · | · | · | · | · | · | · | · | · | · | · | · | · | · | · |
| LEVEL 3 | NORMAL | · | · | · | · | · | FAILURE | · | · | · | · | · | · | · | FAILURE | · | · | NORMAL |
| LEVEL 2 | NORMAL | · | · | · | · | · | NORMAL | · | · | · | · | · | · | · | FAILURE | · | · | NORMAL |
| LEVEL 2 | NORMAL | · | · | · | · | · | FAILURE | · | · | · | · | · | · | · | NORMAL | · | · | FAILURE |
| LEVEL 2 | NORMAL | · | · | · | · | · | NORMAL | · | · | · | · | · | · | · | FAILURE | · | · | FAILURE |
| LEVEL 2 | NORMAL | · | · | · | · | · | FAILURE | · | · | · | · | · | · | · | NORMAL | · | · | FAILURE |
| LEVEL 1 | NORMAL | · | · | · | · | · | NORMAL | · | · | · | · | · | · | · | NORMAL | · | · | FAILURE |
| SENSOR NUMBER | 1 | 2 | 3 | 4 | 5 | 6 | 7 | 8 | 9 | 10 | 11 | 12 | 13 | 14 | 15 | 16 | 17 | 18 |

FIG. 8

| Sensor Number | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| | RADAR | | | | | | CAMERA | | | | | | BLINKER | | VEHICLE SPEED SIGNAL | GPS | STEERING ANGLE | FRONT/REAR G SENSOR |
| Warning Number / Types of Warning | FRONT | RIGHT | LEFT | REAR | REAR RIGHT | REAR LEFT | FRONT | FRONT RIGHT | FRONT LEFT | RIGHT | LEFT | REAR | LEFT | RIGHT | | | | |
| 1 APPROACH OF VEHICLE IN FRONT | LEVEL3 | | | | | | LEVEL2 | | | | | | | | LEVEL2 | | | |
| 2 APPROACH OF CROSSING VEHICLE (4 WHEELS) FROM RIGHT | | LEVEL2 | | | | | | LEVEL1 | | | | | | | | LEVEL1 | | LEVEL2 |
| 3 APPROACH OF CROSSING VEHICLE (2 WHEELS) FROM RIGHT | | LEVEL2 | LEVEL2 | | | | | LEVEL1 | | | | | | | | LEVEL1 | | LEVEL2 |
| 4 SUDDEN APPEARANCE FROM RIGHT | | LEVEL2 | LEVEL2 | | | | | LEVEL1 | | | | | | | | LEVEL1 | | LEVEL2 |
| 5 APPROACH OF 4-WHEEL VEHICLE ON RIGHT SIDE | | LEVEL2 | LEVEL2 | | | | | | | LEVEL1 | | | | | | | | |
| 6 APPROACH OF 2-WHEEL VEHICLE ON RIGHT SIDE | | LEVEL2 | | | | | | | | LEVEL1 | | | | | | | | |
| 7 COLLISION WITH 2-WHEEL VEHICLE ON RIGHT SIDE | | LEVEL2 | | | | | | | | LEVEL2 | | | | | LEVEL2 | | LEVEL2 | |
| 8 APPROACH OF CROSSING VEHICLE (4 WHEELS) FROM LEFT | | | LEVEL2 | | | | | | LEVEL1 | | | | | | | LEVEL1 | | LEVEL2 |
| 9 APPROACH OF CROSSING VEHICLE (2 WHEELS) FROM LEFT | | | LEVEL2 | | | | | | LEVEL1 | | | | | | | LEVEL1 | | LEVEL2 |
| 10 SUDDEN APPEARANCE FROM LEFT | | | LEVEL2 | | | | | | LEVEL1 | | | | | | | LEVEL1 | | LEVEL2 |
| 11 APPROACH OF 4-WHEEL VEHICLE ON LEFT SIDE | | | LEVEL2 | | | | | | | | LEVEL1 | | | | | | | |
| 12 APPROACH OF 2-WHEEL VEHICLE ON LEFT SIDE | | | | | | | | | | | LEVEL1 | | | | | | | |
| 13 COLLISION WITH 2-WHEEL VEHICLE ON LEFT SIDE | | | | | | | | | | | LEVEL2 | | LEVEL2 | | LEVEL1 | | LEVEL2 | |
| 14 PASS OF 2-WHEEL VEHICLE ON REAR-LEFT SIDE | | | | | | LEVEL3 | | | | | | LEVEL1 | LEVEL2 | | LEVEL1 | LEVEL1 | | |
| 15 APPROACH OF VEHICLE ON REAR-LEFT SIDE | | | | | | LEVEL2 | | | | | | LEVEL1 | LEVEL2 | | LEVEL1 | LEVEL1 | LEVEL2 | |
| 16 PASS OF 2-WHEEL VEHICLE ON REAR-RIGHT SIDE | | | | | LEVEL3 | | | | | | | LEVEL1 | | LEVEL2 | LEVEL1 | LEVEL1 | LEVEL2 | |
| 17 APPROACH OF VEHICLE ON REAR-RIGHT SIDE | | | | | LEVEL2 | | | | | | | LEVEL1 | | LEVEL2 | LEVEL1 | LEVEL1 | LEVEL2 | |
| 18 APPROACH OF VEHICLE FROM BEHIND | | | | LEVEL2 | | | | | | | | LEVEL1 | | | LEVEL1 | | | LEVEL1 |

FIG. 9

| WARNING NUMBER | FAULT STATUS | SENSOR IN FAILURE |
|---|---|---|
| WARNING 1 | NORMAL | |
| WARNING 2 | LEVEL 3 | RIGHT RADAR, FRONT-RIGHT CAMERA |
| WARNING 3 | NORMAL | |
| ⋮ | ⋮ | ⋮ |
| WARNING n | LEVEL 1 | REAR CAMERA |

APPARATUS PROVIDING INFORMATION OF A VEHICLE'S SURROUNDINGS

BACKGROUND OF THE INVENTION

1. Field of the Invention

The present invention relates to an apparatus for providing a user in a vehicle with information about situations around the vehicle detected on the basis of outputs from a plurality of sensors.

2. Description of the Related Art

As an apparatus for providing a user in a vehicle with information about situations around the vehicle detected on the basis of output from a plurality of sensors, a technique of detecting a vehicle around the user's own vehicle by using a camera or a radar and presenting information about the detected vehicle to the user is known (e.g., Japanese Unexamined Patent Application Publication No. 7-332966). Also, a technique of using a plurality of radars to detect a vehicle is known (e.g., Japanese Unexamined Patent Application Publication No. 4-238285).

In such an apparatus, even if some of the plurality of sensors fail, information about the situation around the vehicle continues to be provided to the user on the basis of the other sensors. Therefore, the user wrongly believes that the apparatus operates normally.

However, the above-described apparatus has the following problems.

For example, assume that the apparatus includes a right radar to explore the right side of the vehicle and a left radar to explore the left side of the vehicle. Further, assume that a warning of the approach of another vehicle from the right is performed on the basis of an output from the right radar and that a warning of the approach of another vehicle from the left is performed on the basis of output from the left radar. In this case, if the left radar fails and if the warning of the approach of another vehicle from the right is continued on the basis of output from the right radar, the user wrongly believes that the apparatus operates normally. This causes the wrong perception by the user that no vehicle approaches from the left, because a warning is not provided even when a vehicle actually approaches from the left.

On the other hand, if no information about the vehicle's surroundings is provided to the user when some of the plurality of sensors fail, a wrong perception by the user can be prevented. In this case, however, even information that normally can be provided is not provided to the user, so that the convenience of the apparatus for the user deteriorates.

SUMMARY OF THE INVENTION

Accordingly, the present invention is directed to, in an apparatus for providing a user in a vehicle with information about situations around the vehicle detected on the basis of outputs from a plurality of sensors, suppressing the wrong perception of the situations by the user at the occurrence of a failure in a sensor and maintaining the maximum convenience of the apparatus for the user.

In order to achieve the above-described object, the present invention provides an apparatus for providing information about situations around a vehicle to a user in the vehicle. The apparatus is mounted in the vehicle and includes a situation information providing unit configured to detect the occurrence of each of a plurality of predetermined situations around the vehicle on the basis of outputs from a plurality of sensors and provide information about the detected occurrence to the user; a failure detecting unit configured to detect a failure in each of the sensors; and a warning unit configured to calculate the situation whose occurrence cannot be detected normally by the situation information providing unit due to a failure in any of the sensors when the failure detecting unit detects the failure in the sensor, and warn the user that the occurrence of the calculated situation cannot be detected normally.

According to the apparatus, if any of the sensors fails, the situation whose occurrence cannot be detected normally due to the failure is calculated and the user is warned that a notification of the occurrence of the calculated situation cannot be performed normally. Therefore, the user can clearly understand that notification of the situation is not performed. Accordingly, when the warning of a warning type in a normal status is provided but the warning of a warning type in a fault status is not provided, the user can be prevented from wrongly recognizing the actual status.

In the 'apparatus, the situation information providing unit preferably stops detection of the occurrence of the situation if the warning unit determines that the occurrence of the situation cannot be detected normally, so as to eliminate an erroneous notification.

The apparatus may further include a storage unit; a history storing unit configured to store a history in the storage unit each time the situation information providing unit detects the occurrence of the situation, each history including output values of the sensors used to detect the occurrence of the situation and being associated with the occurrence; and an estimated situation information providing unit configured to provide the user with information indicating the possibility that the situation has occurred, the situation being associated with a history among the histories stored in the storage unit, the output values of normally-operating sensors among the output values of all of the sensors in the history being equal or approximate to the output values of the corresponding sensors.

Accordingly, when some of the sensors fail, the occurrence of the situation that cannot be detected normally can be estimated on the basis of the correlation between the history of the situation and output from a normally-operated sensor, and the user can be notified of the estimation.

The plurality of predetermined situations include the approach of another vehicle in each of a plurality of different areas around the vehicle. When the situation information providing unit detects the approach of another vehicle in an area among the plurality of areas, the situation information providing unit notifies the user of the approach of the other vehicle by displaying an image in which an own-vehicle figure representing the user's own vehicle and an other-vehicle figure representing the other vehicle are disposed in accordance with a position relationship therebetween, and indicates an area determined by the warning unit that the approach of another vehicle cannot be detected normally so that the user can recognize the relationship with the own-vehicle figure.

Accordingly, the user can directly recognize an area in which another vehicle approaches and an area where the approach of another vehicle cannot be detected normally by seeing the displayed image.

The apparatus may further include a fault status information presenting unit configured to present an identification of the sensor in which failure is detected by the failure detecting unit and an identification of the situation calculated by the warning unit for which the occurrence notification cannot be performed normally, to the user in accordance with a predetermined operation by the user. Accordingly, the user can obtain a fault occurrence status as necessary.

Also, in order to achieve the above-described object, the present invention provides an apparatus for providing information about situations around a vehicle to a user in the vehicle. The apparatus is mounted in the vehicle and includes a situation information providing unit configured to detect the occurrence of each of a plurality of predetermined situations around the vehicle on the basis of the output from a plurality of sensors and provide information about the detected occurrence to the user; a failure detecting unit configured to detect a failure in each of the sensors; and a warning unit configured to calculate the situation in which the reliability of detection of an occurrence by the situation information providing unit decreases due to failure in any of the sensors when the failure detecting unit detects the failure in the sensor, and warn the user that the reliability of detection of an occurrence of the calculated situation has decreased.

According to the apparatus, if any of the sensors fails, the situation in which the reliability of detection of an occurrence decreases due to the failure is calculated and the user is warned that a notification of the occurrence of the calculated situation cannot be performed with high reliability. Therefore, the user can clearly understand that the reliability of the notification of the situation is low. Accordingly, when a notification of the occurrence cannot be performed with high reliability, the user can be prevented from wrongly recognizing an actual status.

The warning unit may calculate a decreased reliability of detection of an occurrence of the situation by the situation information providing unit and express a warning of the decreased reliability in accordance with a level of the reliability. Also, the warning unit may calculate a decreased reliability of detection of an occurrence of the situation by the situation information providing unit. The situation information providing unit may express the detected occurrence of the situation in accordance with a level of the reliability calculated by the warning unit. Accordingly, the user can recognize the reliability of each notification.

The situation information providing unit preferably stops detection of an occurrence of the situation if the level of the reliability calculated by the warning unit is lower than a predetermined level in the situation. Accordingly, a wrong notification can be suppressed.

The warning unit may calculate a decreased reliability of detection of an occurrence of the situation by the situation information providing unit. The plurality of predetermined situations may include the approach of another vehicle in each of a plurality of different areas around the vehicle. When the situation information providing unit detects the approach of another vehicle in an area among the plurality of areas, the situation information providing unit may notify the user of the approach of the other vehicle by displaying an image in which an own-vehicle figure representing the user's own vehicle and an other-vehicle figure representing the other vehicle are disposed in accordance with a position relationship therebetween, and indicate the level of the reliability, calculated by the warning unit, in each area around the user's vehicle so that the user can recognize the area corresponding to each level in the position relationship with the own-vehicle figure.

Accordingly, the user can directly recognize the approach of another vehicle in each area and the reliability of detection of the approach of another vehicle in each area by seeing the displayed image.

The warning unit may calculate a decreased reliability of detection of an occurrence of the situation by the situation information providing unit. The apparatus may further include a fault status information presenting unit configured to present an identification of the sensor in which failure is detected by the failure detecting unit and a level of the decreased reliability calculated by the warning unit, to the user in accordance with a predetermined operation by the user. Accordingly, the user can obtain a fault occurrence status as necessary.

As described above, according to the present invention, in the apparatus for providing a user in a vehicle with information about situations around the vehicle detected on the basis of the output from a plurality of sensors, erroneous recognition of situations by the user can be suppressed at the occurrence of a failure in the sensor and the maximum convenience of the apparatus for the user can be maintained.

BRIEF DESCRIPTION OF THE DRAWINGS

FIG. 1 is a block diagram showing a configuration of an apparatus according to the first embodiment of the present invention;

FIG. 2 shows a warning fault calculation table according to the first embodiment of the present invention;

FIGS. 3A to 3C show a warning fault status table and a warning history database according to the first embodiment of the present invention;

FIGS. 4A and 4B are flowcharts illustrating a warning fault calculating process and an estimated warning generating process, respectively, performed by the apparatus according to the first embodiment of the present invention;

FIG. 7 shows a warning fault calculation table according to a second embodiment of the present invention;

FIG. 8 shows a warning fault calculation table according to the second embodiment of the present invention;

FIG. 9 shows a warning fault status table according to the second embodiment of the present invention;

DESCRIPTION OF THE PREFERRED EMBODIMENTS

Figure 5B:
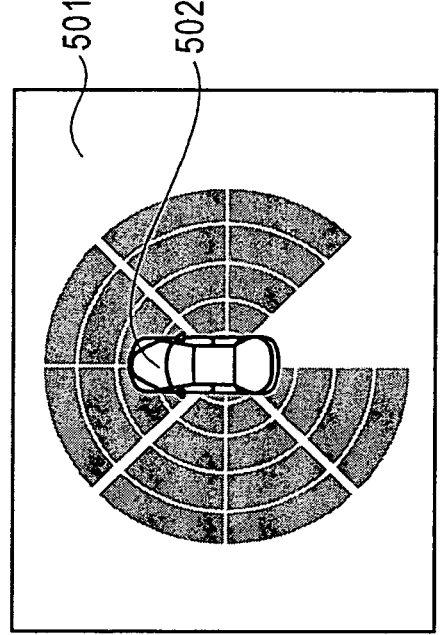
FIGS. 5A to 5D show examples of a screen displayed in the apparatus according to the first embodiment of the present invention.

FIG. 1 shows a configuration of an apparatus according to the first embodiment. The apparatus is mounted in an automobile.

As shown in FIG. 1, the apparatus includes a sensor group 1, a failure-in-sensor detecting unit 2, a warning fault calculating unit 3, a warning fault calculation table 4, a warning fault status table 5, a sensor information processing unit 6, a map database 7, a warning generating unit 8, a warning history database 9, an estimated warning generating unit 10, a warning image generating unit 11, a warning output control unit 12, a display device 13, a speaker 14, and an input device 15.

The apparatus may include a computer. In that case, all or part of the failure-in-sensor detecting unit 2, the warning fault calculating unit 3, the warning fault calculation table 4, the warning fault status table 5, the sensor information processing unit 6, the map database 7, the warning generating unit 8, the warning history database 9, the estimated warning generating unit 10, the warning image generating unit 11, and the warning output control unit 12 may be provided on the computer as a process or information resources through the execution of a predetermined computer program performed by the computer.

The sensor group 1 includes a front radar 101 to explore a front area of the vehicle, a right radar 102 to explore a right area of the vehicle, a left radar 103 to explore a left area of the vehicle, a rear radar 104 to explore a rear area of the vehicle, a rear-right radar 105 to explore a rear-right area of the vehicle, a rear-left radar 106 to explore a rear-left area of the vehicle, a front camera 107 to shoot a front area of the vehicle, a front-right camera 108 to shoot a front-right area of the vehicle, a front-left camera 109 to shoot a front-left area of the vehicle, a right camera 110 to shoot a right area of the vehicle, a left camera 111 to shoot a left area of the vehicle, a rear camera 112 to shoot a rear area of the vehicle, a left blinker sensor 113 to detect a blinking status of a left blinker of the vehicle, a right blinker sensor 114 to detect a blinking status of a right blinker of the vehicle, a vehicle speed sensor 115 to detect a speed of the vehicle, a GPS (global positioning system) 116 to detect a present position of the vehicle by positioning using a satellite, a steering angle sensor 117 to detect an angle of a steering wheel of the vehicle, and a front/rear G sensor 118 to detect acceleration in the front and rear directions of the vehicle. Herein, sensor numbers 1 to 18 are assigned to the above-described respective sensors 101 to 118 in the described order.

FIG. 2 shows the warning fault calculation table 4. The warning fault calculation table 4 shows the correspondence between the respective sensors of the sensor group 1 assigned with sensor numbers 1 to 18 and warning types that normally cannot be used when the respective sensors fail. For example, "influenced" written in the column of sensor number 1 and in the row of warning number 1 "approach of vehicle in front" indicates that a warning of "approach of vehicle in front" normally cannot be output if the front radar 101 fails.

In this embodiment, the following eighteen warning types are used: "approach of vehicle in front"; "approach of crossing vehicle (4 wheels) from right"; "approach of crossing vehicle (2 wheels) from right"; "sudden appearance from right"; "approach of 4-wheel vehicle on right side"; "approach of 2-wheel vehicle on right side"; "collision with 2-wheel vehicle on right side"; "approach of crossing vehicle (4 wheels) from left"; "approach of crossing vehicle (2 wheels) from left"; "sudden appearance from left"; "approach of 4-wheel vehicle on left side"; "approach of 2-wheel vehicle on left side"; "collision with 2-wheel vehicle on left side"; "pass of 2-wheel vehicle on rear-left side"; "approach of vehicle on rear-left side"; "pass of 2-wheel vehicle on rear-right side"; "approach of vehicle on rear-right side"; and "approach of vehicle from behind". Warning numbers 1 to 18 are assigned to the respective eighteen warning types in the described order.

FIG. 3A shows the warning fault status table 5 whose content is registered by the warning fault calculating unit 3. The warning fault status table 5 includes entries provided for the respective warning types assigned with warning numbers 1 to 18. A fault status and a sensor in failure can be registered in the entry of each warning number. "Normal" or "fault" can be registered as a fault status, and one or more sensor numbers can be registered as a sensor in failure. An initial value of the fault status in each entry is "normal".

Referring back to FIG. 1, when the warning output control unit 12 receives a warning voice from the warning fault calculating unit 3, the warning generating unit 8, or the estimated warning generating unit 10, the warning output control unit 12 transmits the warning voice to the speaker 14 so as to warn a user through the warning voice. Also, when the warning output control unit 12 receives a warning image from the warning image generating unit 11, the warning output control unit 12 displays the warning image on the display device 13 so as to warn the user through the warning image.

The sensor information processing unit 6 collects the output from each sensor of the sensor group 1 and converts the output to sensor information that indicates the surroundings or status of the vehicle. For example, output from each of the radars 101 to 106 is converted to sensor information indicating the relative coordinates of another vehicle in relation to the user's own vehicle and the type (2 or 4 wheels) of the other vehicle, the relative coordinates and the type being calculated based on the direction, distance, and size of an object detected by the radar. Output from each of the cameras 107 to 112 is converted to sensor information indicating the relative coordinates of another vehicle in relation to the user's own vehicle and the type (2 or 4 wheels) of the other vehicle, the relative coordinates and the type being calculated based on the position, size, and form of an object shot by the camera. Output from each of the blinker sensors 113 and 114 is converted to sensor information indicating whether the vehicle will change direction or that the vehicle is changing direction. Output from the vehicle speed sensor 115 is converted to sensor information indicating whether the vehicle is running or stopped. Output from the GPS 116 is converted to sensor information indicating whether the vehicle will pass or is passing an intersection, the information being based on the coordinates of the vehicle's present position received from the GPS 116 and map data stored in the map database 7. Output from the steering angle sensor 117 is converted to sensor information indicating whether the vehicle is turning. Output from the front/rear G sensor 118 is converted to sensor information indicating whether the vehicle is accelerating or decelerating.

The warning generating unit 8 determines whether the vehicle is in a state where any of warning numbers 1 to 18 should be produced on the basis of respective pieces of sensor information received from the sensor information processing unit 6. If a warning should be produced, a warning voice of the warning type is sent to the warning output control unit 12. If the warning generating unit 8 determines that the vehicle is in a state where a warning type should be produced, the warning generating unit 8 transmits the warning type to the warning image generating unit 11. Also, if the warning generating unit 8 determines that the vehicle is in a state where a warning type should be produced, the warning generating unit 8 registers the sensor information used in the determination in the warning history database 9 while associating the sensor information with the warning type. As shown in FIG. 3B, the warning history database 9 stores history tables corresponding to the respective warning types. If the warning generating unit 8 determines that the vehicle is in a state where a warning type should be produced, the warning generating unit 8 generates a new entry in the history table of the warning type stored in the warning history database 9 and stores the sensor information used in the determination as a warning history in the generated entry.

For example, assume that sensor information from the front radar 101 or sensor information from the front camera 107 indicates the existence of a vehicle within a predetermined distance in front of the user's own vehicle, and that sensor information from the vehicle speed sensor 115 or sensor information from the front/rear G sensor 118 indicates that the vehicle is running and is not decelerating. In this case, the warning generating unit 8 transmits a warning voice representing the warning type of warning number 1 "approach of vehicle in front" to the warning output control unit 12. The warning voice may be, for example, "A vehicle in front approaches. Decrease speed." Then, the warning generating unit 8 generates a new entry in the history table of warning number 1 in the warning history database 9, and stores the sensor information from the front radar 101, the sensor information from the front camera 107, the sensor information from the vehicle speed sensor 115, and the sensor information from the front/rear G sensor 118 as a warning history in the generated entry.

Also, assume that sensor information from the left radar 103 or sensor information from the front-left camera 109 indicates the existence of a 2-wheel vehicle on the front-left side of the vehicle and that sensor information from the GPS 116 indicates that the vehicle will pass or is passing an intersection. In this case, the warning generating unit 8 transmits a warning voice representing a warning of warning number 10 "approach of crossing vehicle (2 wheels) from left" to the warning output control unit 12. The warning voice may be, for example, "Attention! A motorcycle approaches from the left." Then, the warning generating unit 8 generates a new entry in the history table of warning number 10 in the warning history database 9, and stores the sensor information from the left radar 103, the sensor information from the front-left camera 109, and the sensor information from the GPS 116 as a warning history in the generated entry.

However, if "fault" is registered as a fault status of a warning type in the entry of the warning fault status table 5, the warning generating unit 8 determines that a warning of the warning type should not be generated, and does not transmit a warning voice representing the warning type to the warning output control unit 12. Therefore, if "fault" is registered as a fault status of a warning type in the warning fault status table 5, a warning history of the warning type is not registered in the history table in the warning history database 9.

The failure-in-sensor detecting unit 2 shown in FIG. 1 detects whether the respective sensors 101 to 118 have a failure and notifies the warning fault calculating unit 3 of the detection result. Then, the warning fault calculating unit 3 performs a warning fault calculating process shown in FIG. 4A.

As shown in FIG. 4A, in this process, the warning fault calculating unit 3 monitors the occurrence of a failure in the sensors on the basis of a notification from the failure-in-sensor detecting unit 2 (step 402). If a failure has occurred in any of the sensors, the warning fault calculating unit 3 extracts all warning types "influenced" by the sensor having the failure from the warning fault calculation table 4 shown in FIG. 2 (step 404).

Then, the following process is performed on each of the extracted warning types. First, it is determined whether "fault" has been registered as a fault status in the entry of the extracted warning type in the warning fault status table 5 shown in FIG. 3A (step 408). If "fault" has been registered in the entry, the sensor number of the sensor having a failure is registered in the entry (step 418). Then, the process on this warning type ends.

On the other hand, if "fault" is not registered as a fault status in the entry of the extracted warning type in the warning fault status table 5 (step 408), "fault" is registered as a fault status in the entry, and the sensor number of the sensor in failure is registered in the entry (step 410). Then, a voice message warning that a warning fault will occur due to the failure in the sensor is transmitted to the warning output control unit 12 (step 412). For example, if the rear-right radar 105 of sensor number 5 is in failure, warning number 16 "pass of 2-wheel vehicle on rear-right side" and warning number 17 "approach of vehicle on rear-right side" do not operate normally. Therefore, a voice message "The rear-right radar 105 is in failure. Approach of vehicle on rear-right side and pass of 2-wheel vehicle on rear-right side cannot be detected. Be sure to visually check the status." is generated and is transmitted to the warning output control unit 12. Then, the process on this warning type ends.

After the above-described process has been conducted on all of the warning types extracted in step 404, the process returns to step 402, where another occurrence of a failure in a sensor is awaited.

As described above, if "fault" is registered as a fault status in the warning fault status table 5, the warning generating unit 8 does not transmit a warning of the corresponding warning type.

The estimated warning generating unit 10 performs warning by estimating circumstances for the warning type in which warning is not performed by the warning generating unit 8. FIG. 4B shows an estimated warning generating process performed by the estimated warning generating unit 10.

As shown in FIG. 4B, in this process, the sensor information processing unit 6 obtains sensor information from the respective sensors (step 452). Then, all warning types whose fault status is "fault" in the warning fault status table 5 are extracted as warning types for estimation (step 454). Then, the following process is performed on each of the extracted warning types.

First, each warning history registered in the history table (each row of the history table shown in FIG. 3B) of the warning type for estimation is obtained from the warning history database 9 (step 458). Then, it is determined whether there exists a warning history in which all sensor information from the sensors except the sensor registered as a broken sensor in the entry of the warning type for estimation in the warning fault status table 5 is equal or approximate to the sensor information included in the sensor information obtained in step 452 (step 460). If such a warning history does not exist, the process on this warning type for estimation ends.

On the other hand, if such a warning history exists (step 460), it is estimated that the situation occurring now is the same as a previous situation where a warning of the warning type for estimation was generated. In that case, a voice message indicating the warning of the warning type for estimation is generated and is transmitted to the warning output control unit 12, and the warning type for estimation is transmitted to the warning image generating unit 11 (step 462). Then, the process on this warning type for estimation ends.

For example, assume that the front radar 101 is in failure and thus "fault" is registered as a fault status in the entry of warning number 1 in the warning fault status table 5, and that the history table of warning number 1 is in the state shown in C1 in FIG. 3C. In this case, if the sensor information shown in C2 in FIG. 3C has been obtained, the estimated warning generating unit 10 performs the following process on each entry of the history table of warning number 1.

That is, it is determined whether the obtained sensor information includes sensor information that is equal or approximate to the sensor information registered in the entry except the sensor-1 information about the failed front radar 101 (sensor-7 information and sensor-18 information). In other words, it is determined whether the sensor information that is equal or approximate to the sensor-7 information from the front camera 107 registered in the entry is included in the obtained sensor information as the sensor-7 information generated at this time. Also, it is determined whether the sensor information that is equal or approximate to the sensor-18 information from the front/rear G sensor 118 registered in the entry is included in the obtained sensor information as the sensor-18 information generated at this time.

If there exists an entry in which the sensor information that is equal or approximate to the sensor information except the sensor-1 information about the failed front radar 101 (sensor-7 information and sensor-18 information) is included in the obtained sensor information, a voice message indicating a warning of the warning type for estimation is generated and is transmitted to the warning output control unit 12. For example, in the case of warning number 1 "approach of vehicle in front", a voice message, "A vehicle in front may be approaching. Please check," is generated and is transmitted to the warning output control unit 12. Also, this warning type for estimation is transmitted to the warning image generating unit 11. If such an entry does not exist, the process on this warning type ends.

Herein, the warning voice generated by the warning generating unit 8 and the warning voice generated by the estimated warning generating unit 10 have different nuances even if the warning type is the same. For example, in the type of warning number 1 "approach of vehicle in front", the warning generating unit 8 generates a warning voice to draw attention to the detected vehicle and urge the user to take action, e.g., "A vehicle in front approaches. Decrease speed." On the other hand, the estimated warning generating unit 10 generates a warning voice indicating that the reliability of the warning is lower and thus the user needs to verify the warning himself, e.g., "A vehicle in front may be approaching. Please check."

In the above-described estimated warning generating process, a certain level of reliability should be ensured in an estimation of the situation where a warning of a warning type for estimation should be generated. Therefore, in step 460, it is further determined whether a plurality of sensors have been registered as failed sensors in the entry of the warning type for estimation in the warning fault status table 5, or whether a predetermined number or more of sensors have been registered in each warning type. If the sensors have been registered, the process unconditionally proceeds to step 464, and the process on this warning type for estimation ends. Alternatively, in step 460, it is further determined whether one or more sensors that are predetermined for each warning type have been registered as failed sensors in the entry of the warning type for estimation in the warning fault status table 5. If the sensors have been registered, the process unconditionally proceeds to step 464, and the process on this warning type for estimation ends. In other words, in the case of warning number 1 "approach of vehicle in front" , for example, if the front radar 101 and the front camera 107 have been registered as failed sensors, a vehicle in front cannot be detected at all. Therefore, the process unconditionally proceeds to step 464, and the process on this warning type for estimation ends.

Referring back to FIG. 1, the warning image generating unit 11 generates an image showing the situation around the vehicle and transmits the image to the warning output control unit 12. When the fault status of all warning types is "normal" in the warning fault status table 5, that is, when a warning of all warning types can be performed normally, the warning image generating unit 11 generates the image shown in FIG. 5A and transmits it to the warning output control unit 12. In the image shown in FIG. 5A, an own-vehicle figure 502 representing the user's own vehicle is disposed on a monitored status image 501 showing that the entire circumference of the vehicle is monitored. If a warning type is transmitted from the warning generating unit 8, an other-vehicle figure 503 is generated in accordance with the warning type and is disposed on the monitored status image 501.

The other-vehicle figure 503 is generated and disposed in the following manner. If the warning type transmitted from the warning generating unit 8 relates to a 2-wheel vehicle of warning number 3, 6, 7, 9, 12, 13, 14, or 16, the other-vehicle figure 503 is a figure of a motorcycle. If the warning type transmitted from the warning generating unit 8 is one of the other types, the other-vehicle figure 503 is a figure of a car, as shown in FIG. 5A.

Then, a relative position of the other vehicle warned by the warning type transmitted from the warning generating unit 8 to the user's own vehicle is found on the basis of the sensor information from the radars of sensor numbers 1 to 6 and the cameras of sensor numbers 7 to 12 transmitted from the sensor information processing unit 6. Then, the other-vehicle figure 503 is displayed at the position on the monitored status image 501 corresponding to the relative position.

If the fault status of any warning type in the warning fault status table 5 is "fault", the warning image generating unit 11 modifies the monitored status image 501.

For example, in the warning fault status table 5, if "fault" is registered as a fault status in the entry of the warning number 1, which relates to the front side of the vehicle, the monitored status image 501 is modified so as to show that the front side is not monitored by at least one warning type. If "fault" is registered as a fault status in any of the entries of warning numbers 2 to 4, which relate to the front-right side of the vehicle, the monitored status image 501 is modified so as to show that the front-right side is not monitored by at least one warning type. If "fault" is registered as a fault status in any of the entries of warning numbers 5 to 7, which relate to the right side of the vehicle, the monitored status image 501 is modified so as to show that the right side is not monitored by at least one warning type. If "fault" is registered as a fault status in any of the entries of warning numbers 8 to 10, which relate to the front-left side of the vehicle, the monitored status image 501 is modified so as to show that the front-left side is not monitored by at least one warning type. If "fault" is registered as a fault status in any of the entries of warning numbers 11 to 13, which relate to the left side of the vehicle, the monitored status image 501 is modified so as to show that the left side is not monitored by at least one warning type. If "fault" is registered as a fault status in any of the entries of warning numbers 14 to 15, which relate to the rear-left side of the vehicle, the monitored status image 501 is modified so as to show that the rear-left side is not monitored by at least one warning type. If "fault" is registered as a fault status in any of the entries of warning numbers 16 to 17, which relate to the rear-right side of the vehicle, the monitored status image 501 is modified so as to show that the rear-right side is not monitored by at least one warning type. If "fault" is registered as a fault status in the entry of warning number 18, which relates to the rear side of the vehicle, the monitored status image 501 is modified so as to show that the rear side is not monitored by at least one warning type.

Figure 5D:
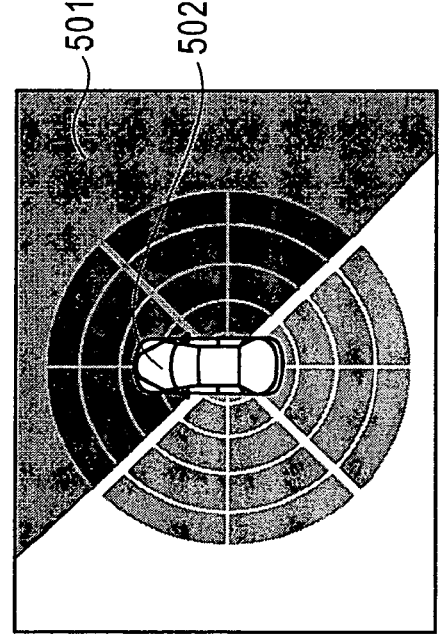
Figure 5A:
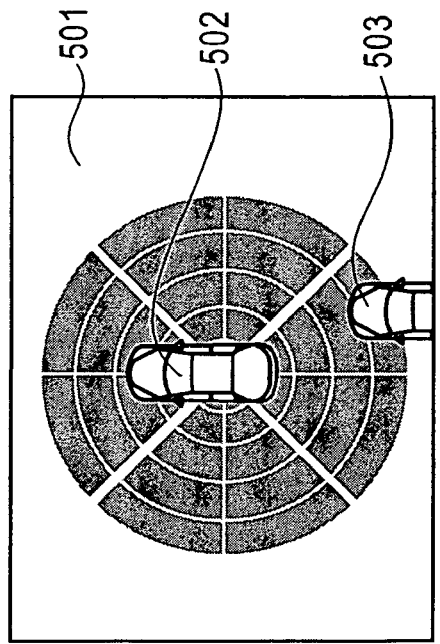
Figure 5C:
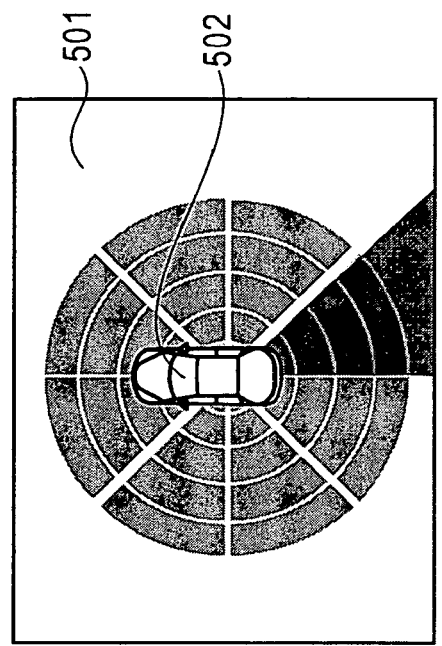

FIGS. 5B and 5C show examples of the monitored status image 501 that has been modified so as to show that the rear-right side is not monitored by at least one warning type. As shown in the figures, the monitored status image 501 in FIG. 5A shows radar waves radiated in all directions from the user's own vehicle so as to illustrate that the entire circumference is monitored. On the other hand, in the monitored status image 501 shown in FIG. 5B, radar waves are not shown radiated in the rear-right direction so as to illustrate that all directions except the rear-right direction are monitored normally. In the monitored status image 501 shown in FIG. 5C, the rear-right direction of the image is shaded so as to illustrate that all directions except the rear-right direction are monitored normally.

When "fault" is registered as a fault status in the entry of warning number 1 relating to the front side and when "fault" is registered as a fault status in any of the entries of warning numbers 2 to 4 relating to the right side, the monitored status image 501 is modified to that shown in FIG. 5D so as to show that the front side and the right side are not monitored by at least one warning type.

Figure 6A:
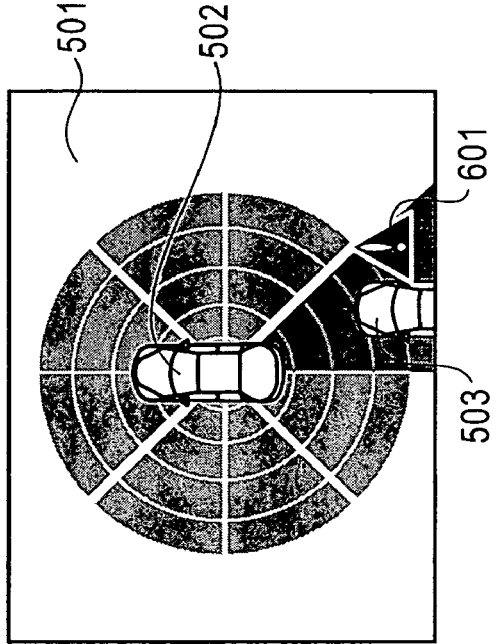
FIGS. 6A to 6C show examples of a screen displayed in the apparatus according to the first embodiment of the present invention.
Figure 6B:
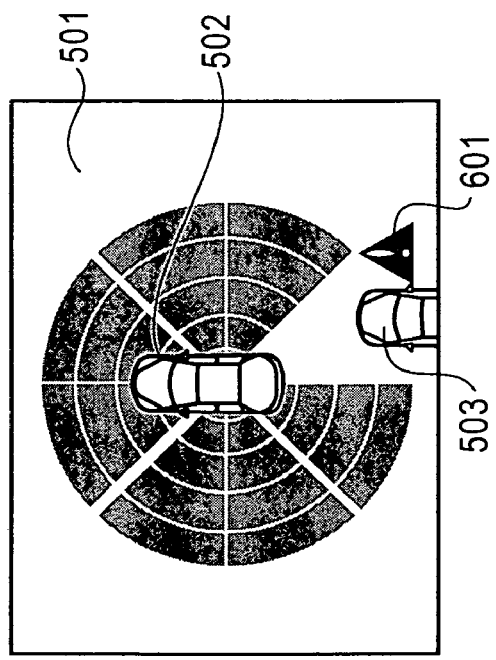

When the warning image generating unit 11 receives a warning type from the estimated warning generating unit 10, the warning image generating unit 11 generates an other-vehicle figure 503 in accordance with the warning type and disposes it on the monitored status image 501 as shown in FIGS. 6A and 6B, as in the case where the warning image generating unit 11 receives a warning type from the warning generating unit 8. However, when displaying the other-vehicle FIG. 503 on the basis of the warning type transmitted from the estimated warning generating unit 10, the warning image generating unit 11 displays a caution mark 601 near the other-vehicle figure 503 so that the user can recognize that the reliability of the warning indicated by the other-vehicle figure 503 is lower.

While the monitored status image 501 showing that part of the circumference of the vehicle is not monitored by at least one warning type is displayed, if the user selects an area of the direction that is not monitored by at least one warning type through the input device 15, the warning image generating unit 11 displays an information window 603 on the monitored status image 501 so as to present the fault occurrence status about the selected position to the user.

Figure 6C:
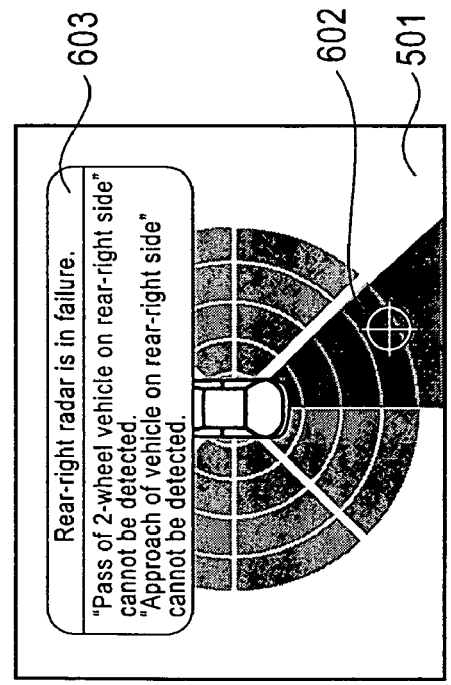

For example, if a position on the rear-right side of the vehicle is selected by an icon 602 as shown in FIG. 6C while the monitored status image 501 showing that the rear-right side of the vehicle is not monitored by at least one warning type is displayed, a warning type whose fault status is "fault" among the warning types of warning numbers 16 and 17, which relate to the rear-right side of the vehicle, and the sensor number of a broken sensor registered in the entry of "fault" are obtained. Then, a message saying that warning of the obtained warning type cannot be performed because the sensor of the obtained sensor number is in failure is displayed in the information window 603. For example, assume that the rear-right radar 105 of sensor number 5 is in failure and thus "fault" is registered as a fault status in the entries of warning number 16 "pass of 2-wheel vehicle on rear-right side" and warning number 17 "approach of vehicle on rear-right side" and that the rear-right radar 105 is registered as a sensor in failure. In this case, a message saying that the rear-right radar 105 is in failure and that "pass of 2-wheel vehicle on rear-right side" and "approach of vehicle on rear-right side" cannot be detected is displayed in the information window 603, as shown in FIG. 6C.

According to the first embodiment described above, if a sensor is in failure, a warning type whose warning cannot be generated normally due to the failure is calculated, and a warning indicating that the warning of the calculated warning type cannot be performed normally is presented to the user. Therefore, the user can clearly understand that the warning of the warning type is not performed. Accordingly, when the warning of a warning type in a normal status is generated but the warning of a warning type in a fault status is not generated, the user is prevented from wrongly perceiving the actual status. Further, the user can directly recognize the position and the direction of another vehicle that cannot be detected normally by seeing an image produced from the warning image generating unit 11.

Hereinafter, a second embodiment of the present invention is described.

In the above-described first embodiment, the fault status of each warning type is managed by classifying it into "normal" or "fault". In the second embodiment, the fault status is managed by classifying it into one of four statuses: "normal", "level 1", "level 2", and "level 3".

In a state of "level 1", although part of the sensors used to determine whether a warning of a certain warning type should be generated is in failure, the warning generating unit 8 can properly determine whether a warning of the warning type should be generated by using a normally-operating sensor.

In a state of "level 2", although part of the sensors used to determine whether a warning of a certain warning type should be generated is in failure, the warning generating unit 8 can determine whether a warning of the warning type should be generated with a certain level of reliability by using a normally-operating sensor.

In a state of "level 3", part of the sensors used to determine whether a warning of a certain warning type should be generated is in failure, and the warning generating unit 8 cannot determine whether a warning of the warning type should be generated even by using a normally-operating sensor.

The configuration of an apparatus according to the second embodiment is the same as that of the first embodiment shown in FIG. 1. Hereinafter, a difference in operation between the first and second embodiments is described.

FIG. 7 shows a warning fault calculation table 4 stored in the apparatus according to the second embodiment. As shown in FIG. 7, the warning fault calculation table 4 according to the second embodiment includes level tables corresponding to respective warning numbers. Each level table defines the correspondence between the combination of failures in the respective sensors of sensor numbers 1 to 18 and the fault status "level 1", "level 2", and "level 3" of the warning type. The mark "*" in each level table indicates that whether the sensor is in failure is arbitrary. The fault status of a warning type is defined as "normal" for the combination of failure in the respective sensors not defined in the level table.

According to this warning fault calculation table 4, when all of the sensors operate normally, if failure occurs in one of the sensors, the relationship between the sensor having the failure and the fault status "normal", "level 1", "level 2", or "level 3" of each warning type is determined. Further, according to this warning fault calculation table 4, when one or a plurality of specific sensors are in failure, if another sensor fails, the relationship between the sensor having the failure and the fault status "normal", "level 1", "level 2", or "level 3" of each warning type is determined.

FIG. 9 shows a warning fault status table 5 according to the second embodiment. As shown in FIG. 9, the warning fault status table 5 includes entries provided for the respective warning types of warning numbers 1 to 18. A fault status and a sensor in failure can be registered in each entry. In the second embodiment, "normal", "level 1", "level 2", or "level 3" can be registered as a fault status. Also, one or a plurality of sensor numbers can be registered as a sensor in failure. The initial value of the fault status in each entry is "normal".

Figure 10:
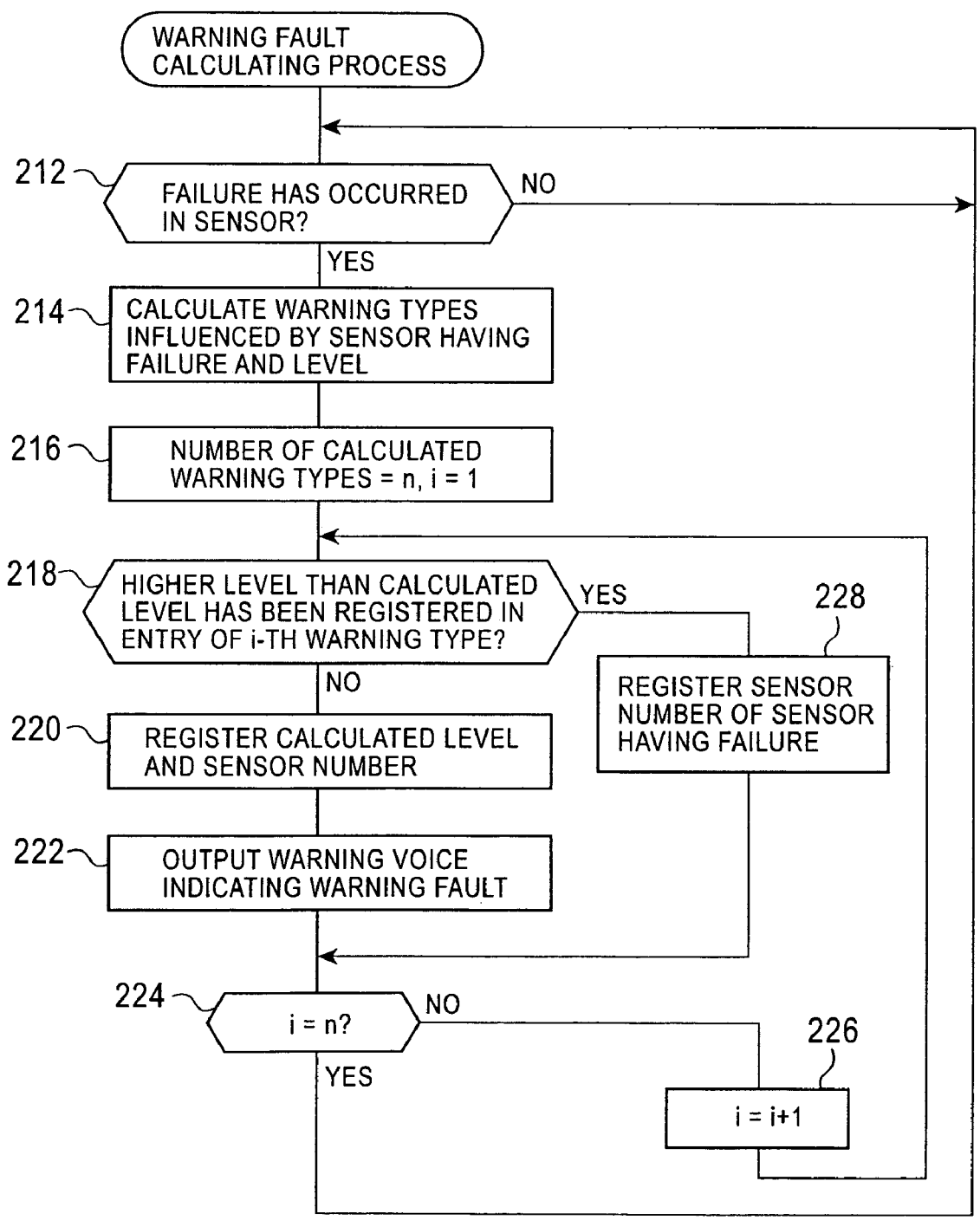
FIG. 10 is a flowchart illustrating a warning fault calculating process performed by the apparatus according to the second embodiment of the present invention.

Hereinafter, a warning fault calculating process performed by the warning fault calculating unit 3 according to the second embodiment is described with reference to FIG. 10. As shown in FIG. 10, in this warning fault calculating process, the warning fault calculating unit 3 monitors the occurrence of a failure in the sensors on the basis of a notification from the failure-in-sensor detecting unit 2 (step 212). If a failure has occurred in one of the sensors, the warning fault calculating unit 3 refers to the level tables of the respective warning types in the warning fault calculation table 4 shown in FIG. 7, and calculates a warning type influenced by the failure in the sensor (a warning type whose fault status may change due to the failure) and the fault status ("normal", "level 1", "level 2", or "level 3") of each warning type corresponding to the combination of all sensors in failure at present (step 214).

Then, the following process is performed on each of the extracted warning types.

It is determined whether a level higher than the level of the already-calculated fault status is registered as a fault status in the entry of the extracted warning type in the warning fault status table 5 shown in FIG. 9 (step 218). Note that, the level of the warning status becomes higher in the order of "normal", "level 1", "level 2", and "level 3".

If a higher level has already been registered, the sensor number of the failed sensor is added in the entry (step 228). Then, the process on this warning type ends.

On the other hand, if a level higher than the level of the already-calculated fault status is not registered as a fault status in the entry of the extracted warning type (step 218), a level calculated as a fault status (any of "level 1", "level 2", and "level 3") is registered in the entry and the sensor number of the failed sensor is added (step 220). Then, a warning voice according to the calculated level warning that a warning fault may occur due to a failure in the sensor is transmitted to the warning output control unit 12 (step 222), and the process on this warning type ends.

More specifically, if the fault status of a warning type is calculated to be level 3 due to a failure in a sensor, a voice message saying that the sensor is in failure and that warning of the warning type cannot be performed is transmitted to the warning output control unit 12. If the fault status of a warning type is calculated to be level 2 due to a failure in a sensor, a voice message saying that the sensor is in failure and that warning of the warning type may be wrongly performed is transmitted to the warning output control unit 12. If the fault status of a warning type is calculated to be level 1 due to a failure in a sensor, a voice message saying that the sensor is in failure and that the failure does not affect the warning of the warning type is transmitted to the warning output control unit 12.

For example, assume a case where the rear-right radar 105 of sensor number 5 is in failure, and accordingly, the fault status of warning number 16 "pass of 2-wheel vehicle on rear-right side" becomes level 3 and the fault status of warning number 17 "approach of vehicle on rear-right side" becomes level 2. In this case, a voice message, "The rear-right radar 105 is in failure. Approach of vehicle on rear-right side cannot be detected. Pass of 2-wheel vehicle from rear-right side may be wrongly detected. Be sure to visually check the status," is generated and is transmitted to the warning output control unit 12. Also, when the vehicle speed sensor 115 is in failure and when the fault status of the warning type "pass of 2-wheel vehicle from rear-right side" becomes level 1, a voice message, "The vehicle speed sensor 115 is in failure, but it does not affect the detection of pass of 2-wheel vehicle from rear-right side. Detection is continued," is generated and is transmitted to the warning output control unit 12.

After the above-described process has been performed on all of the warning types extracted in step 216, the process returns to step 212, where another failure in a senor is awaited.

As in the warning generating unit 8 according to the first embodiment, the warning generating unit 8 according to the second embodiment determines whether the user's own vehicle is in a situation where any of the warning types of warning numbers 1 to 18 should be generated on the basis of each piece of sensor information received from the sensor information processing unit 6. If a warning should be generated, a warning voice of the corresponding warning type is transmitted to the warning output control unit 12. Also, if the warning generating unit 8 determines that the user's own vehicle is in a situation where a warning of a certain warning type should be generated, the warning generating unit 8 transmits the warning type to the warning image generating unit 11. Further, if the warning generating unit 8 determines that the user's own vehicle is in a situation where a warning of a certain warning type should be generated, the warning generating unit 8 registers the sensor information used in the determination in the history table of the warning type in the warning history database 9.

However, if "level 3" is registered as a fault status in the entry of a warning type in the warning fault status table 5, the warning generating unit 8 determines that a warning of the warning type should not be generated, and does not transmit a warning voice of the warning type to the warning output control unit 12. Further, if "level 3" or "level 2" is registered in the entry of a warning type in the warning fault status table 5, the warning history of the warning type is not registered in the history table in the warning history database 9.

A warning voice of a warning type whose fault status registered in the warning fault status table 5 is "level 1" or "normal" and a warning voice of a warning type whose fault status registered in the warning fault status table 5 is "level 2" have different nuances even if the warning type is the same. For example, in the warning type of warning number 1 "approach of vehicle in front", if "level 1" or "normal" is registered in the entry of this warning type in the warning fault status table 5, the warning generating unit 8 generates a voice message to draw attention to the detected vehicle in front and urge the user to take action, e.g., "A vehicle in front approaches. Decrease speed." On the other hand, if "level 2" is registered in the entry of this warning type in the warning fault status table 5, the warning generating unit 8 generates a voice message indicating that the reliability of the warning is lower and thus the user needs to verify the warning himself, e.g., "A vehicle in front may be approaching. Please check."

The estimated warning generating unit 10 performs the estimated warning generating process shown in FIG. 4B, as with the estimated warning generating unit 10 according to the first embodiment. However, in step 454, all warning types whose fault status registered in the warning fault status table 5 is "level 3" are extracted as warning types for estimation. In the second embodiment, the estimated warning generating unit 10 may not be provided.

The warning image generating unit 11 generates an image showing the situation around the user's own car and transmits the image to the warning output control unit 12, as in the first embodiment.

Figure 11A:
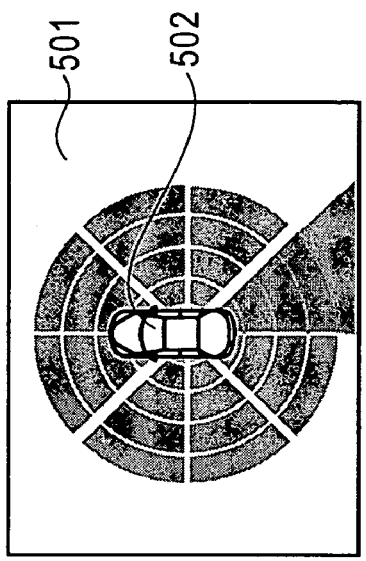
FIGS. 11A to 11F show examples of a screen displayed in the apparatus according to the second embodiment of the present invention.

When the fault status of all of the warning types in the warning fault status table 5 is "normal" or "level 1", the warning image generating unit 11 generates the image shown in FIG. 11A as an image to be transmitted to the warning output control unit 12. In the image shown in FIG. 11A, an own-vehicle figure 502 representing the user's own vehicle is displayed on a monitored status image 501 showing that the entire circumference of the vehicle is monitored. When a warning type is transmitted from the warning generating unit 8, the warning image generating unit 11 generates an other-vehicle figure 503 according to the transmitted warning type and displays it on the monitored status image 501.

When the fault status of any of the warning types in the warning fault status table 5 is "level 2" or "level 3", the warning image generating unit 11 modifies the monitored status image 501. More specifically, when "level 3" is registered as a fault status in the entry of the warning type of warning number 1 relating to the front side of the vehicle in the warning fault status table 5, the monitored status image 501 is modified so as to indicate that the front side is not monitored by at least one warning type. When "level 2" is registered as a fault status, the monitored status image 501 is modified so as to indicate that the front side is not monitored by at least one warning type with high reliability. When "level 3" is registered as a fault status in any of the entries of the warning types of warning numbers 2 to 4 relating to the right side of the vehicle, the monitored status image 501 is modified so as to indicate that the right side is not monitored by at least one warning type. When "level 3" is not registered in any of the entries and when "level 2" is registered in any of the entries, the monitored status image 501 is modified so as to indicate that the front-right side is not monitored by at least one warning type with high reliability. This is the same for the warning types of warning numbers 5 to 7 relating to the right side of the vehicle, the warning types of warning numbers 8 to 10 relating to the front-left side of the vehicle, the warning types of warning numbers 11 to 13 relating to the left side of the vehicle, the warning types of warning numbers 14 to 15 relating to the rear-left side of the vehicle, the warning types of warning numbers 16 to 17 relating to the rear-right side of the vehicle, and the warning type of warning number 18 relating to the rear side of the vehicle. When "level 3" is registered as a fault status in any of the entries of the warning types in the warning fault status table 5, the monitored status image 501 is modified so as to indicate that the direction corresponding to the warning type is not monitored by at least one warning type. When "level 3" is not registered in any of the entries and when "level 2" is registered in any of the entries, the monitored status image 501 is modified so as to indicate that the direction corresponding to the warning type is not monitored by at least one warning type with high reliability.

Figure 11B:
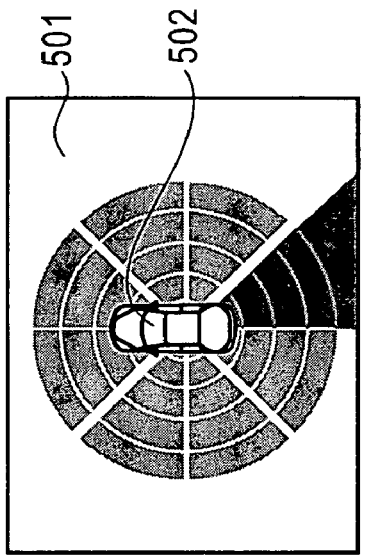
Figure 11C:
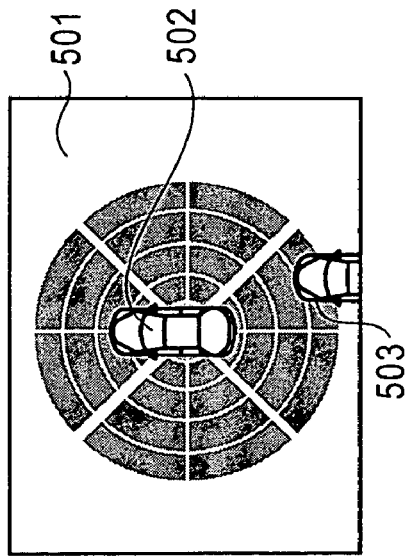

FIG. 11B shows an example of the monitored status image 501 that has been modified to show that the rear-right side is not monitored by at least one warning type because "level 3" is registered in any of the entries of the warning types relating to the rear-right side. FIG. 11C shows an example of the monitored status image 501 that has been modified to show that the rear-right side is not monitored by at least one warning type with high reliability because "level 3" is not registered in any of the entries of the warning types relating to the rear-right side but "level 2" is registered in any of the entries.

As shown in the figures, in the monitored status image 501 shown in FIG. 11B, the rear-right side is shaded in a dark color so as to indicate that the entire circumference except the rear-right side is monitored normally and that the rear-right side is not monitored by at least one warning type. In the monitored status image 501 shown in FIG. 11C, the rear-right side is shaded in a light color so as to indicate that the entire circumference except the rear-right side is monitored normally and that the rear-right side is monitored by at least one warning type with lower reliability.

As described above, if the warning image generating unit 11 receives a warning type from the warning generating unit 8, the warning image generating unit 11 generates an other-vehicle figure 503 according to the warning type and displays it on the monitored status image 501. The other-vehicle figure 503 is modified in accordance with the fault status registered in the entry of the received warning type.

Figure 11D:
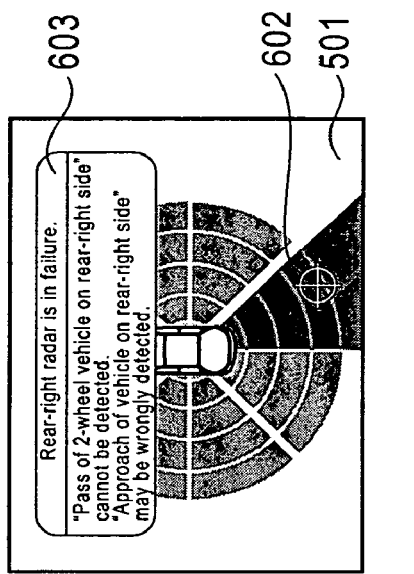
Figure 11E:
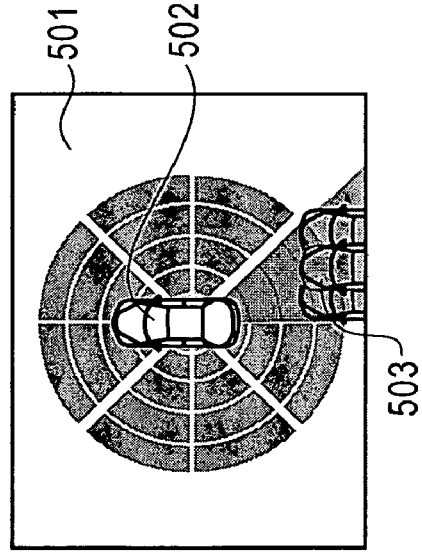

That is, when the fault status registered in the entry of the received warning type in the warning fault status table 5 is "normal" or "level 1", a car or a 2-wheel vehicle is definitely drawn as the other-vehicle figure 503, as shown in FIG. 11A or 11D. When the fault status registered in the entry of the received warning type in the warning fault status table 5 is "level 2", a car or a 2-wheel vehicle is indefinitely drawn as the other-vehicle figure 503, as shown in FIG. 11E, so as to notify the user that the existence or position of a vehicle indicated by the other-vehicle figure 503 may be wrong. Also, a car or a 2-wheel vehicle is indefinitely drawn as the other-vehicle figure 503 as shown in FIG. 11E when a warning type is transmitted from the estimated warning generating unit 10.

When the monitored status image 501 shown in FIGS. 11B to 11E, showing that part of the circumference of the vehicle is not monitored by at least one warning type or is not monitored by at least one warning type with high reliability, is displayed, if the user selects an area that is not monitored by at least one warning type or that is not monitored by at least one warning type with high reliability through the input device 15, the warning image generating unit 11 displays an information window 603 on the monitored status image 501 and presents a warning fault occurrence status about the selected area to the user.

Figure 11F:
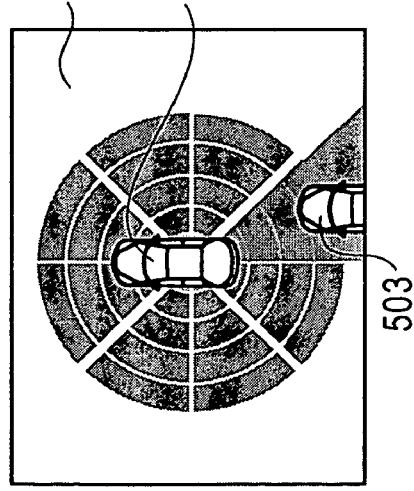

More specifically, assume that a position on the rear-right side of the vehicle is selected by an icon 602 as shown in FIG. 11F when the monitored status image 501 indicating that the rear-right side of the vehicle is not monitored by at least one warning type is displayed. In this case, among the warning types of warning numbers 16 and 17 relating to the rear-right side of the vehicle, a warning type whose fault status registered in the warning fault status table 5 is "level 2" or "level 3" and a sensor number registered as a sensor having a failure in the entry in which "level 2" or "level 3" is registered are obtained. Then, a message saying that a warning of the obtained warning type cannot be performed or cannot be performed with high reliability because the sensor of the obtained sensor number is in failure is displayed in the information window 603. For example, assume a case where the rear-right radar 105 of sensor number 5 is in failure, "level 3" is registered as a fault status and the rear-right radar 105 is registered as a sensor in failure in the entry of warning number 16 "pass of 2-wheel vehicle on rear-right side" in the warning fault status table 5, and "level 2" is registered as a fault status and the rear-right radar 105 is registered as a sensor in failure in the entry of warning number 17 "approach of vehicle on rear-right side" in the warning fault status table 5. In this case, a message saying that the rear-right radar 105 is in failure, "pass of 2-wheel vehicle on rear-right side" cannot be detected, and "approach of vehicle on rear-right side may be wrongly detected" is displayed in the information window 603, as shown in FIG. 11F.

According to the second embodiment, if a sensor is in failure, a warning type whose reliability decreases due to the failure is calculated, and the decreased reliability of the calculated warning type and the level of fault are presented to the user. Therefore, the user can clearly understand the reliability of the warning of each warning type. Accordingly, when a warning is not reliable, the user may not accept the warning, so that an incorrect perception of the actual status can be prevented. Further, the warning generating unit 8 expresses each warning in accordance with the level of the fault status in the warning type of the warning, and thus the user can directly recognize the reliability of the warning rather than individual warnings.

The user can directly recognize the position of a vehicle around his vehicle and the reliability of a warning about the existence and the positions of other vehicles in all directions by seeing an image generated by the warning image generating unit 11.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. An apparatus for providing information about situations around a vehicle to a user in the vehicle, the apparatus being mounted in the vehicle and comprising:
   a situation information providing unit configured to detect an occurrence of each of a plurality of predetermined situations around the vehicle on the basis of output from a plurality of sensors and provide information about the detected occurrence to the user;
   a failure detecting unit configured to detect a failure in each of the sensors;
   a warning unit configured to calculate the situation whose occurrence cannot be detected normally by the situation information providing unit due to a failure in any of the sensors when the failure detecting unit detects the failure in a sensor, and warn the user that an occurrence of the calculated situation cannot be detected normally, wherein the situation whose occurrence cannot be detected normally is calculated on the basis of output from normally-operating sensors;
   a storage unit;
   a history storing unit configured to store a history in the storage unit every time the situation information providing unit detects an occurrence of the situation, each history including output values of the sensors used to detect the occurrence of the situation and being associated with the occurred situation; and
   an estimated situation information providing unit configured to provide the user with information indicating the possibility that the situation has occurred, the situation being associated with a history among the histories stored in the storage unit, the output values of normally-operating sensors among the output values of all of the sensors in the history being equal or approximate to the output values of the corresponding sensors.

2. The apparatus according to claim 1, wherein the situation information providing unit stops detection of an occurrence of the situation if the warning unit determines that occurrence of the situation cannot be detected normally.

3. The apparatus according to claim 1,
   wherein the plurality of predetermined situations include the approach of another vehicle in each of a plurality of different areas around the vehicle, and
   wherein, when the situation information providing unit detects an occurrence of the approach of another vehicle in an area among the plurality of areas, the situation information providing unit notifies the user of the approach of the other vehicle by displaying an image in which an own-vehicle figure representing the user's own vehicle and an other-vehicle figure representing the other vehicle are displayed in accordance with a position relationship therebetween, and indicates an area determined by the warning unit that an approach of another vehicle cannot be detected normally.

4. The apparatus according to claim 1, further comprising:
   a fault status information presenting unit configured to present an identification of the sensor in which failure is detected by the failure detecting unit and an identification of the situation calculated by the warning unit for which notification of an occurrence cannot be performed normally, to the user in accordance with a predetermined operation by the user.

5. An apparatus for providing information about situations around a vehicle to a user in the vehicle, the apparatus being mounted in the vehicle and comprising:
   a situation information providing unit configured to detect an occurrence of each of a plurality of predetermined situations around the vehicle on the basis of output from a plurality of sensors and provide information about the detected occurrence to the user;
   a failure detecting unit configured to detect a failure in each of the sensors; and
   a warning unit configured to calculate the situation in which the reliability of detection of an occurrence by the situation information providing unit decreased due to a failure in any of the sensors when the failure detecting unit detects the failure in the sensor, and warn the user that the reliability of detection of an occurrence of the calculated situation decreased;
   wherein the situation whose reliability of detection of an occurrence decreased is calculated on the basis of output from normally-operating sensors, and wherein the warning unit calculates a decreased reliability of detection of an occurrence of the situation by the situation information providing unit and provides a type of warning of the decreased reliability in accordance with a level of the reliability from among a plurality of reliability levels in addition to a normal reliability level.

6. The apparatus according to claim 5,
   wherein the warning unit calculates a decreased reliability of detection of an occurrence of the situation by the situation information providing unit, and
   wherein the situation information providing unit identifies the detected occurrence of the situation in accordance with a level of the reliability calculated by the warning unit from among the plurality of reliability levels.

7. The apparatus according to claim 6,
   wherein the situation information providing unit stops detection of an occurrence of the situation if the level of the reliability calculated by the warning unit is lower than a predetermined level.

8. The apparatus according to claim 5,
   wherein the warning unit calculates a decreased reliability of detection of an occurrence of the situation by the situation information providing unit,
   wherein the plurality of predetermined situations include the approach of another vehicle in each of a plurality of different areas around the vehicle, and
   wherein, when the situation information providing unit detects an occurrence of the approach of another vehicle in an area among the plurality of areas, the situation information providing unit notifies the user of the approach of the other vehicle by displaying an image in which an own-vehicle figure representing the user's own vehicle and an other-vehicle figure representing the other vehicle are displayed in accordance with a position relationship therebetween, and indicates the level of the reliability, calculated by the warning unit, in each area around the user's own vehicle.

9. The apparatus according to claim 5,
wherein the warning unit calculates a decreased reliability of detection of an occurrence of the situation by the situation information providing unit, and
wherein the apparatus further comprises a fault status information presenting unit configured to present an identification of the sensor in which failure is detected by the failure detecting unit and a level of the decreased reliability calculated by the warning unit from among the plurality of reliability levels to the user in accordance with a predetermined operation by the user.

10. A method for providing information about situations around a vehicle to a user in the vehicle, the method comprising:
detecting an occurrence of each of a plurality of predetermined situations around the vehicle on the basis of output from a plurality of sensors and providing information about the detected occurrence to the user, wherein the plurality of predetermined situations include the approach of another vehicle in each of a plurality of different areas around the vehicle;
detecting the existence of a failure in each of the sensors; and
calculating the situation whose occurrence cannot be detected normally due to a failure in any of the sensors when the failure in a sensor is detected, and warning the user that an occurrence of the calculated situation cannot be detected normally, wherein the situation whose occurrence cannot be detected normally is calculated on the basis of output from normally-operating sensors;
wherein, when an occurrence of the approach of another vehicle in an area among the plurality of different areas is detected, the user is notified of the approach of the other vehicle by displaying an image in which an own-vehicle figure representing the user's own vehicle and an other-vehicle figure representing the other vehicle are displayed in accordance with a position relationship therebetween, and indicating an area around the user's own vehicle in the image in which the approach of another vehicle cannot be detected normally.

11. The method according to claim 10, wherein detection of an occurrence of the situation is stopped if it is determined that an occurrence of the situation cannot be detected normally.

12. The method according to claim 10, further comprising:
presenting an identification of the sensor in which failure is detected and an identification of the situation calculated for which notification of an occurrence cannot be performed normally, to the user in accordance with a predetermined operation by the user.

13. A method for providing information about situations around a vehicle to a user in the vehicle, the method comprising:
detecting an occurrence of each of a plurality of predetermined situations around the vehicle on the basis of output from a plurality of sensors and providing information about the detected occurrence to the user, wherein the plurality of predetermined situations include the approach of another vehicle in each of a plurality of different areas around the vehicle;
detecting the existence of a failure in each of the sensors; and
calculating the situation in which the reliability of detection of an occurrence decreased due to a failure in any of the sensors when the failure in the sensor is detected, and warning the user that the reliability of detection of an occurrence of the calculated situation decreased, wherein the situation whose reliability of detection of an occurrence decreased is calculated on the basis of output from normally-operating sensors;
wherein, when an occurrence of the approach of another vehicle in an area among the plurality of different areas is detected, the user is notified of the approach of the other vehicle by displaying an image in which an own-vehicle figure representing the user's own vehicle and an other-vehicle figure representing the other vehicle are displayed in accordance with a position relationship therebetween, and indicating the level of reliability in each area around the user's own vehicle in the image.

14. The method according to claim 13, further comprising:
calculating a decreased reliability of detection of an occurrence of the situation,
wherein a type of warning of the decreased reliability is provided in accordance with a level of the reliability from among a plurality of reliability levels.

15. The method according to claim 13, further comprising:
calculating a decreased reliability of detection of an occurrence of the situation,
wherein the detected occurrence of the situation is identified in accordance with a level of the reliability from among a plurality of reliability levels.

16. The method according to claim 15,
wherein detection of an occurrence of the situation is stopped if the level of the reliability is lower than a predetermined level.

* * * * *